(12) United States Patent
Kim et al.

(10) Patent No.: US 7,097,143 B2
(45) Date of Patent: Aug. 29, 2006

(54) INSTALLATION EQUIPMENT FOR DISPLAY MAIN BODY AND JIG FOR INSTALLATION EQUIPMENT

(75) Inventors: Seong-soo Kim, Suwon (KR); Sang-hak Kim, Suwon (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 10/613,012

(22) Filed: Jul. 7, 2003

(65) Prior Publication Data

US 2004/0251387 A1    Dec. 16, 2004

(30) Foreign Application Priority Data

Sep. 19, 2002    (KR) ............................... 2002-57234

(51) Int. Cl.
    *F16M 11/00*    (2006.01)
(52) U.S. Cl. .................. 248/201; 248/917; 248/919; 248/922; 248/923
(58) Field of Classification Search .............. 248/201, 248/286.1, 396, 923, 276.1, 284.1, 917, 919, 248/90, 921, 922, 371, 476, 479, 478, 486, 248/487
See application file for complete search history.

(56) References Cited

U.S. PATENT DOCUMENTS

| 3,259,102 | A |   | 7/1966  | Jackson        |          |
|-----------|---|---|---------|----------------|----------|
| 4,558,839 | A | * | 12/1985 | Kaplan et al.  | 248/542  |
| 5,918,841 | A | * | 7/1999  | Sweere et al.  | 248/123.11 |
| 6,145,797 | A | * | 11/2000 | Uehara         | 248/291.1 |
| 6,402,109 | B1 | * | 6/2002  | Dittmer        | 248/284.1 |
| 6,886,701 | B1 | * | 5/2005  | Hong et al.    | 211/99   |
| 2002/0033436 | A1 | * | 3/2002 | Peng et al.   | 248/284.1 |

FOREIGN PATENT DOCUMENTS

| EP | 11344934     | 12/1999 |
| EP | 200003138    | 1/2000  |
| EP | 1054373      | 6/2000  |
| EP | 1 054 373 A2 | 11/2000 |
| EP | 2002328626   | 11/2002 |
| JP | 11-344934    | 12/1999 |
| JP | 11344934     | 12/1999 |
| JP | 2000-003138  | 1/2000  |

OTHER PUBLICATIONS

Chinese Patent Office Action for corresponding Chinese Patent Application No. 03137803.X issued Sep. 9, 2005.

* cited by examiner

*Primary Examiner*—Amy J. Sterling
(74) *Attorney, Agent, or Firm*—Staas & Halsey LLP (57) ABSTRACT

Installation equipment for mounting a display main body onto an installation surface, includes a link assembly including a first link having a first end rotatably attached to the installation surface, a second link having a first end rotatably attached to the display main body and a second end rotatably attached to a second end of the second link, and a spring member provided in at least one joint area of the first and second links and elastically biasing the display main body toward a wall; a lower supporting bracket attached to the installation surface and rotatably supporting a lower back of the display main body; and an upper supporting bracket attached to the installation surface and supporting the link assembly. The present invention provides installation equipment and a jig which have a simple structure and are convenient for mounting the display main body onto a wall.

28 Claims, 11 Drawing Sheets

INSTALLATION EQUIPMENT FOR DISPLAY MAIN BODY AND JIG FOR INSTALLATION EQUIPMENT

CROSS-REFERENCE TO RELATED APPLICATION

This application claims the benefit of Korean Application No. 2002-57234, filed Sep. 19, 2002, in the Korean Intellectual Property Office, the disclosure of which is incorporated herein by reference.

BACKGROUND OF THE INVENTION

1. Field of the Invention

The present invention relates to installation equipment for a display main body and a jig for the installation equipment, and more particularly to installation equipment for a display main body and a jig for the installation equipment, which is an improvement in mounting a display main body onto a wall.

2. Description of the Related Art

Installation equipment for a display main body is generally used in mounting, onto a predetermined installation surface, a display main body having a screen. Recently, the screen of the display main body has been made of an LCD (liquid crystal display), a PDP (plasma display panel), etc., allowing the display main body to be thin and the screen to be relatively wide. Since the display main body is thin, the display main body can be conveniently mounted onto a predetermined installation surface such as a wall.

Figure 1:
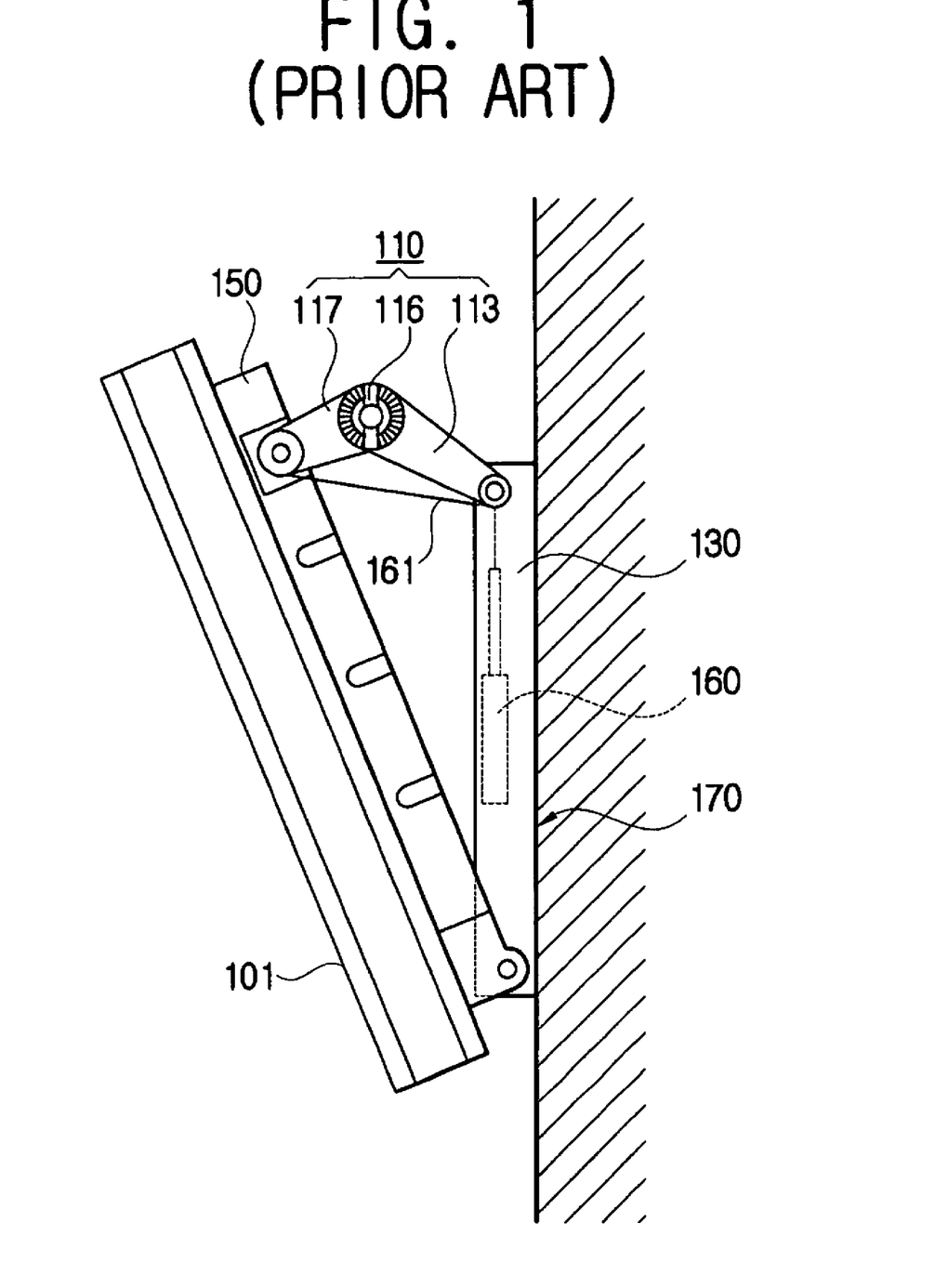
FIG. 1 is a side view of a conventional installation equipment for a display main body.
Figure 2:
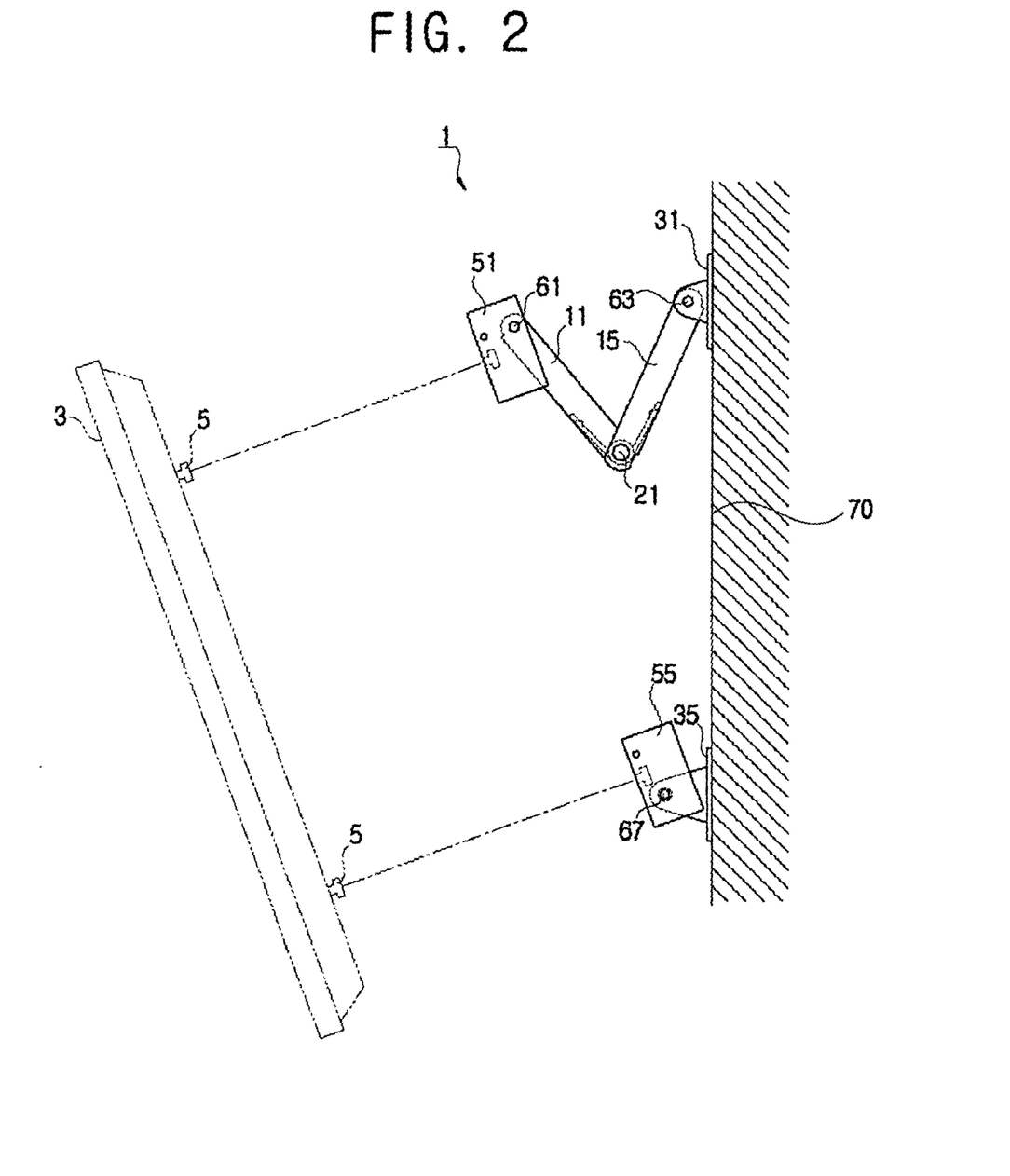
FIG. 2 is a side view of installation equipment for a display main body according to a first embodiment of the present invention.

Accordingly, installation equipment, which was disclosed in Japanese Patent No. JP11344934, was developed to mount an object such as a display main body to a wall 170. This conventional installation equipment, as shown in FIG. 1, includes a pair of arms 150 supporting a display main body 101 having a screen, a base 130 attached to a wall and rotatably attached to the arms 150 at a lower part thereof, and a mounting bracket 110 provided between the arm 150 and the base 130 and rotatably connecting the arm 150 with the base 130.

The mounting bracket 110 includes a first link 113 having a first end rotatably attached to the base 130 at an upper part thereof, a second link 117 having a first end rotatably attached to the arm 150 and a second end rotatably attached to a second end of the first link 113, and a locking member 116 provided in the second ends of the first and second links 113 and 117 and used in adjusting an angle between the first and second links 113 and 117. A compression spring (not shown) is inside the locking member 116, which locks and unlocks rotation between the first and second links 113 and 117 by using the elastic force of the compression spring. Herein, the angle between the first and second links 113 and 117 is selected from seven predetermined angles by the locking member 116. The base 130 is provided with a damping part. The shock absorber includes a gas damper 160 attached to the base 130, and a wire 161 having a first end coupled to an upper end of the gas damper 160 and a second end coupled to a shaft (not shown) connecting two arms 150. Hence, when the locking member 116 is released, the damping part prevents the display main body 101 from tilting forward suddenly due to its own weight.

As described above, the conventional installation equipment comprises the arm 150 and the base 130, which are placed between the display main body 101 and the wall, and the mounting bracket 110, which is placed between the arm 150 and the base 130, to permit an object such as the display main body 101 to be tilted about a predetermined axis. Further, the mounting bracket 110 includes the locking member 116, so that the tilt of the object can be locked at a predetermined angle and unlocked. Further, the base 130 includes the damping part having the gas damper 160 and the wire 161, so that when the locking member 116 is released, the damping part can prevent the object from tilting forward suddenly due to its own weight. Thus, a user can adjust the tilt of the object by pushing and pulling the object.

However, the conventional installation equipment is not only complicated because the damping part has the gas damper 160 and wire 161, the locking member 116, etc., but such installation equipment is also inconvenient because, when the user tilts the object, the object can be pushed and pulled when the locking member 116 is released. Further, in the conventional installation equipment, it is impossible to adjust the tilt of the object finely because the locking member can stepwise lock the tilt of the object. Furthermore, the conventional installation equipment is not compatible with display main bodies of various sizes because the sizes of the arms and the base depend on the size of the display main body.

SUMMARY OF THE INVENTION

Accordingly, it is an aspect of the present invention to provide installation equipment for a display main body and a jig for the installation equipment, wherein the installation equipment and the jig have a simple structure and are convenient for mounting the display main body onto a wall.

Another aspect of the present invention is to provide installation equipment for a display main body and a jig for the installation equipment, which allow the display main body to be tilted easily and finely adjusted, and which are compatible with various sizes of the display main body.

Additional aspects and advantages of the invention will be set forth in part in the description which follows and, in part, will be obvious from the description, or may be learned by practice of the invention.

The foregoing and/or other aspects of the present invention are achieved by providing installation equipment for mounting a display main body onto an installation surface, wherein the installation equipment has a link assembly including a first link having a first end rotatably attached to the installation surface, a second link having a first end rotatably attached to the display main body and a second end rotatably attached to a second end of the first link, a spring member provided in at least one joint area of the first and second links and elastically biasing a display main body toward the wall, a lower supporting bracket attached to the installation surface and rotatably supporting the lower back of the display main body, and an upper supporting bracket attached to the installation surface and supporting the link assembly.

According to an aspect of the invention, the upper supporting bracket is rotatably attached to the first end of the first link.

According to an aspect of the invention, the installation equipment further includes an upper main bracket detachably attached to the upper back of the display main body and rotatably attached to the first end of the second link and a lower main bracket detachably attached to the lower back of the display main body and rotatably attached to the lower supporting bracket.

According to an aspect of the invention, the link assembly further includes a friction part provided in a joint area between the first and second links and resisting rotation between the first and second links.

According to an aspect of the invention, the resisting force of the friction part is stronger than the elastic force of the spring member.

According to an aspect of the invention, the spring member includes a torsion spring having a first end coupled to the first link and a second end coupled to the second link.

According to an aspect of the invention, the friction part includes a bolt passing through the torsion spring and the joint area between the first and second links, a nut matching with the bolt, and at least one washer interposed between the bolt and the nut.

According to an aspect of the invention, the upper and lower main brackets are formed with projection holding parts in correspondence with the projections provided in the back of the display main body.

According to an aspect of the invention, the projection includes a shank part protruding from the back of the display main body and a head part formed on the end of the shank part and having a larger diameter than the shank part. In addition, the projection holding part includes an upper part larger than the head part of the projection and a lower part smaller than the head part and larger than the shank part of the projection.

According to an aspect of the invention, the upper and lower main brackets further include a safety bolt to prevent the display main body from breaking away from the upper and lower main brackets due to an external force and a safety bolt hole through which the safety bolt is attached to the projection holding part.

According to another aspect of the present invention, the foregoing and/or other aspects may be also achieved by providing installation equipment for mounting a display main body onto an installation surface, including an upper main bracket attached to the installation surface and detachably attached to the upper back of the display main body, and a lower main bracket attached to the installation surface and detachably attached to the lower back of the display main body.

According to an aspect of the invention, the upper and lower main brackets are formed with projection holding parts in correspondence with the projections provided in the back of the display main body.

According to an aspect of the invention, the projection includes a shank part protruding from the back of the display main body and a head part formed on the end of the shank part and having a larger diameter than the shank part. Also, the projection holding part includes an upper part larger than the head part of the projection and a lower part smaller than the head part and larger than the shank part of the projection.

According to an aspect of the invention, the upper and lower main brackets further include a safety bolt to prevent the display main body from breaking away from the upper and lower main brackets due to an external force and a safety bolt hole into which the safety bolt is fastened across the projection holding part.

According to another aspect of the present invention, the foregoing and/or other aspects may be also achieved by providing a jig installing the above-described installation equipment onto an installation surface. The jig includes a jig frame shaped like a plate and at least one pair of supporting arms, including a first part attached to opposite end parts of the jig frame and a second part detachably attached to the installation equipment, respectively.

According to an aspect of the invention, the first part of the supporting arm is rotatably attached to the jig frame.

According to an aspect of the invention, one of the supporting arm and the jig frame is formed with a slot shaped like an arc and guiding rotation of the supporting arm relative to the jig frame within a predetermined angle, and the other one is provided with a guide projection inserted in and guided by the slot.

According to an aspect of the invention, the second part of the supporting arm is provided with a combining projection part protruding in correspondence with a projection holding part of the installation equipment.

According to an aspect of the invention, the combining projection part includes three magnetic projections.

According to an aspect of the invention, the supporting arms are provided as a pair in opposite end parts of the jig frame.

BRIEF DESCRIPTION OF THE DRAWINGS

These and/or other aspects and advantages of the present invention will become apparent and more readily appreciated from the following description of the embodiments, taken in conjunction with the accompanying drawings of which.

DETAILED DESCRIPTION OF THE EMBODIMENTS

Reference will now be made in detail to the embodiments of the present invention, examples of which are illustrated in the accompanying drawings, wherein like reference numerals refer to like elements throughout. The embodiments are described below in order to explain the present invention by referring to the figures.

As shown in FIGS. 2 through 5, according to a first embodiment of the present invention, installation equipment 1 for a display main body is used for tiltably mounting a display main body 3 having a screen onto an installation surface such as a wall 70. The installation equipment 1 includes upper and lower main brackets 51 and 55 having a "C"-shaped cross-section and supporting a display main body 3, upper and lower supporting brackets 31 and 35 supporting the upper and lower main brackets 51 and 55 and attached to the wall 70, and a link assembly 10 provided between the upper main bracket 51 and the upper supporting bracket 31. It should be noted that, although only sets of two brackets are shown in the figures, any desired number of brackets may be used (single, triple, etc.)

Figure 3:
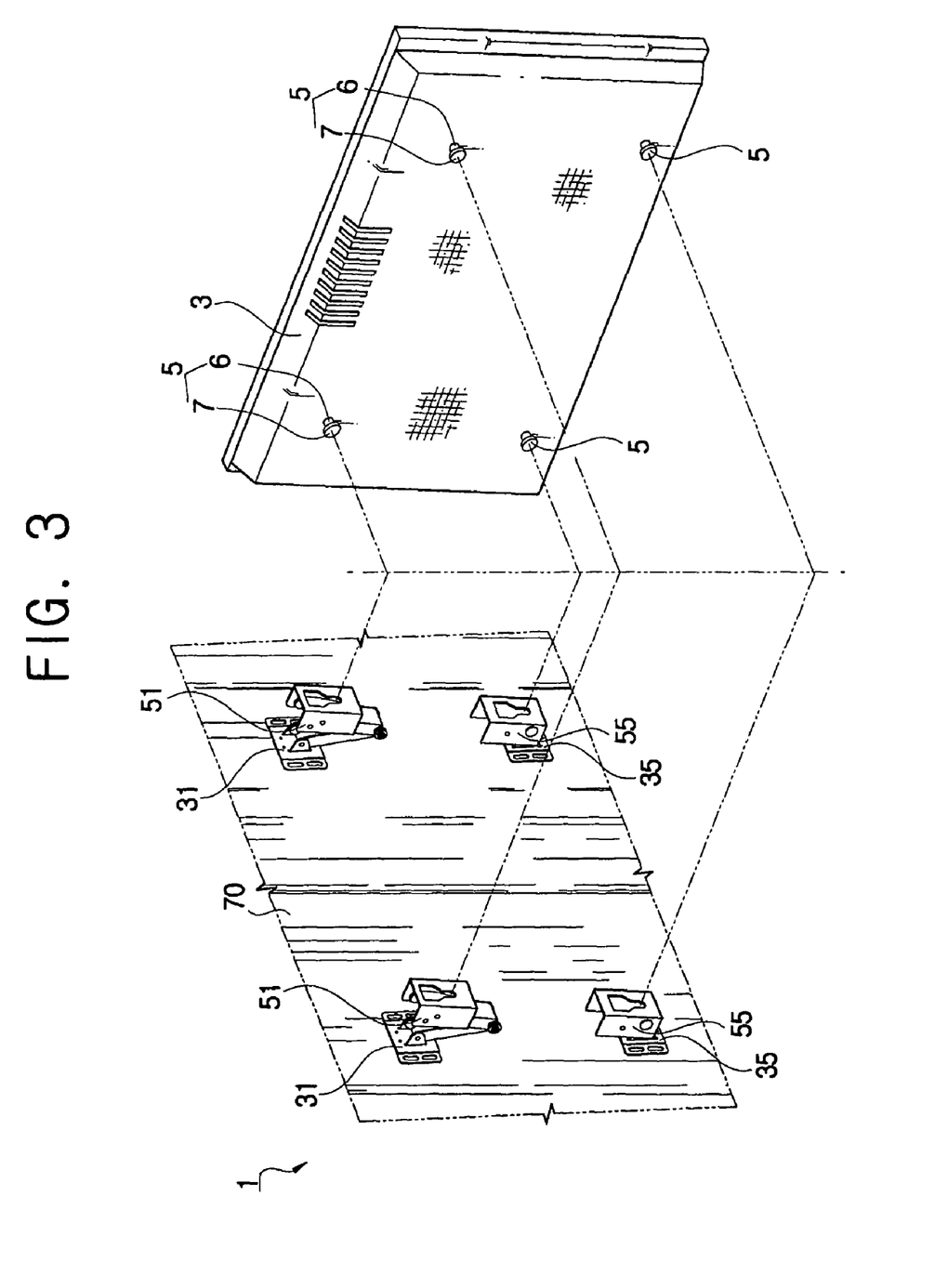
FIGS. 3 and 4 are perspective views of the installation equipment of FIG. 2, being mounted to a wall.

As shown in FIG. 3, the installation equipment 1 is attached onto the wall 70 using a set of brackets and latched to the display main body 3 symmetrically. The left bracket will be representatively described below. The display main body 3 has a screen made of an LCD, a PDP, etc. in the front thereof, and includes a plurality of projections 5 to be latched to projection holding parts 52 of the upper and lower main brackets 51 and 55 (to be described later) in the back thereof. Herein, it is preferable that the number of projections 5 is equal to the number of projection holding parts 52 provided in the upper and lower main brackets 51 and 55. However, where desired, the number of projections 5 may be smaller or larger than the number of projection holding parts 52. The projection 5 includes a shank part 6 protruding from the back of the display main body 3 and a head part 7 formed on the end of the shank part 6 and having a larger diameter than the shank part 6.

Figure 5:
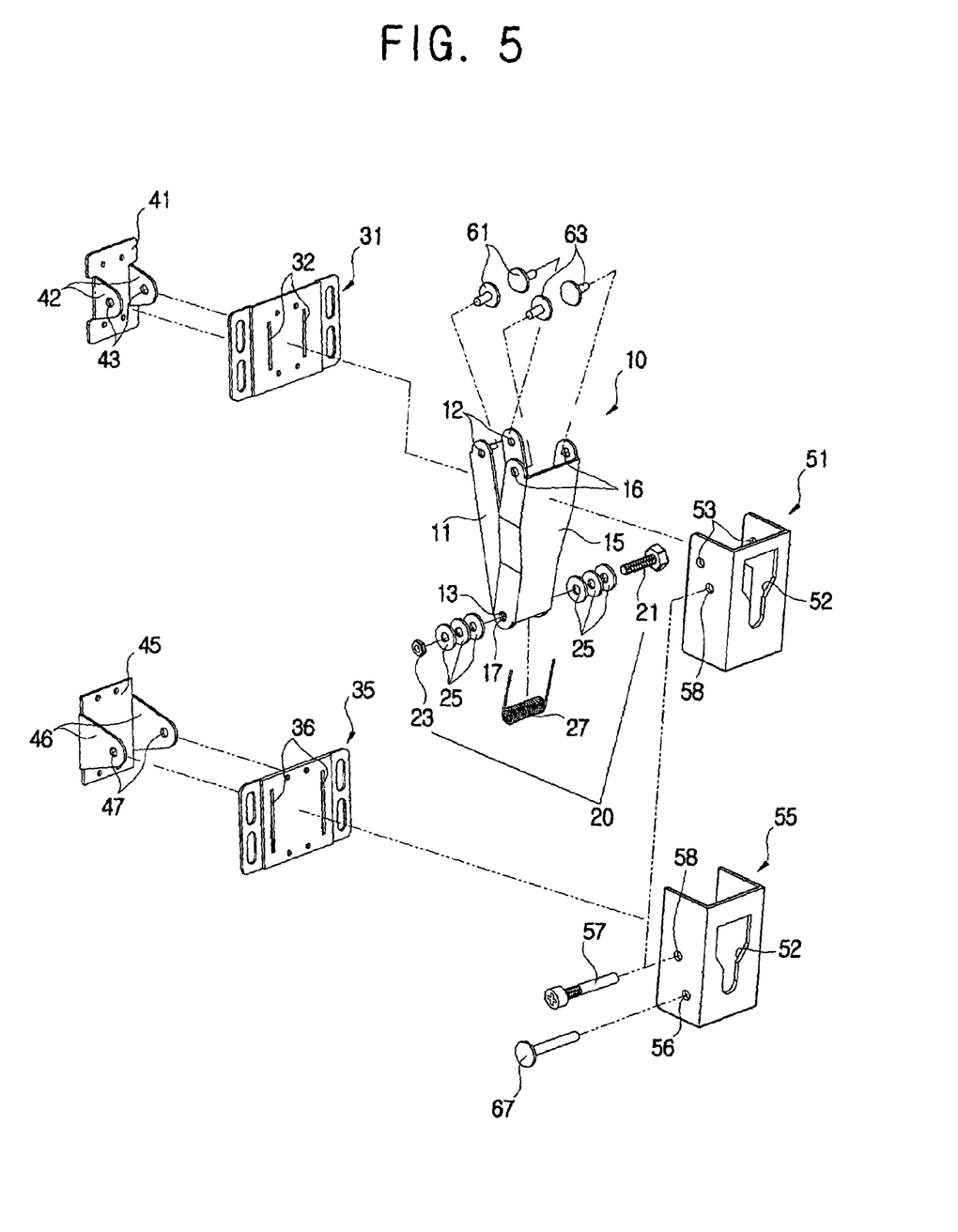
FIG. 5 is an exploded perspective view of the installation equipment of FIG. 2.

The upper main bracket 51 is formed with a pair of second pin combining holes 53 to be aligned with second pin through holes 16 of a second link 15 (to be described later). Herein, the upper main bracket 51 has a larger width than the second link 15 to accommodate the second link 15 in the upper main bracket 51. The lower main bracket 55 has the same shape as the upper main bracket 51 and is formed with a pair of third pin combining holes 56 to be rotatably attached to second link brackets 45 of the lower supporting bracket 35 (to be described later). Further, the upper and lower main brackets 51 and 55 are formed with the projection holding parts 52 in correspondence with the projections 5 provided in the back of the display main body 3, respectively.

The projection holding part 52 includes an upper part larger than the head part 7 of the projection 5 and a lower part smaller than the head part 7 and larger than the shank part 6 of the projection 5. Therefore, the head part 7 of the projection 5 provided in the back of the display main body 3 is first inserted into the upper part of the projection holding part 52. Then, the head part 7 is latched to the lower part of the projection holding part 52 by moving the head part 7 downward. Thus, the display main body 3 is conveniently attached to the upper and lower main brackets 51 and 55. Further, each of the upper and lower main brackets 51 and 55 includes a safety bolt 57 to prevent the display main body 3 from breaking away from the upper and lower main brackets 51 and 55 due to an external force. The safety bolt 57 is attached to a safety bolt hole 58. Therefore, after latching the projections 5 of the display main body 3 to the upper and lower main brackets 51 and 55, the safety bolts 57 are inserted into the safety bolt holes 58 across the projections 5, respectively, to prevent the projection 5 from breaking away from the projection holding part 52.

The upper and lower supporting brackets 31 and 35 are shaped like a plate, and attached to the wall 70. The upper supporting bracket 31 is formed with a pair of first slits 32, and a first link bracket 41 passes through the first slits 32 and is rotatably attached to first pin through holes 12 of a first link 11 (to be described later). The lower supporting bracket 35 is formed with a pair of second slits 36 corresponding to the first slits 32 of the upper supporting brackets 31, and a second link bracket 45 passes through the second pair of slits 36 and is rotatably attached to the third pin combining hole 56 of the lower main bracket 55. The first link bracket 41 is located as a plate between the wall 70 and the upper supporting bracket 31 and has a pair of first brackets 42 perpendicular to the plate and passing through the first slits 32 of the upper supporting bracket 31. At an end part of each first bracket 42 a first pin combining hole 43 is formed to be rotatably attached to the first pin through hole 12 of the first link 11. The second link bracket 45 is located as a plate between the wall 70 and the lower supporting bracket 35 in correspondence with the position of the first link bracket 41 and has a pair of second brackets 46 perpendicular to the plate and passing through the second slits 36 of the lower supporting bracket 35. At an end part of each second bracket 42 the third pin through hole 47 is formed to be rotatably attached to the third pin combining hole 56 of the lower main bracket 55.

The link assembly 10 includes the first and second links 11 and 15 placed behind an upper part of the display main body 3 and linking the display main body 3 with the upper supporting bracket 31 attached onto the wall 70, a torsion spring 27 interposed between the first and second links 11 and 15 and elastically biasing the display main body 3 toward the wall 70, and a friction part 20 provided in a joint area between the first and second links 11 and 15 and resisting rotation between the first and second links 11 and 15. In this embodiment, the resisting force caused by the friction part 20 is stronger than the elastic force of the torsion spring 27. The first link 11 has a "C"-shaped cross section and has a first end formed with the pair of first pin through holes 12 rotatably attached to the first pin combining holes 43 of the first link bracket 41 by a pair of first hinge pins 61. The first link 11 has a second end formed with a pair of first bolt holes 13 rotatably attached to the second link 15. The second link 15 has a "C"-shaped cross section like the first link 11 and has a first end formed with the pair of second pin through holes 16 rotatably attached to the second pin combining holes 53 of the upper main bracket 51 by a pair of second hinge pins 63. The second link 15 includes a second end formed with a pair of second bolt holes 17 rotatably attached to the first bolt hole 13 of the first link 11. Herein, the width of the second link 15 is larger than the width of the first link 11, so that the second link 15 can accommodate the first link 11 by rotation.

The torsion spring 27 is inserted onto a bolt 21 of the friction part 20 and has a first end coupled to the first link 11 and a second end coupled to the second link 15. Further, the torsion spring 27 has an elastic force that opposes opening the first and second links 11 and 15. Hence, the torsion spring 27 elastically biases the display main body 3 toward the wall 70. In one embodiment, the elastic force of the torsion spring 27 is substantially equal to the torque generated when the display main body 3 is tilted about the third hinge pin 67 by the display main body's weight, thus minimizing the net torque applied to the display main body 3. The friction part 20 includes the bolt 21 passing through the first bolt hole 13 of the first link 11, the second bolt hole 17 of the second link 15, and the torsion spring 27, a nut 23 matching with the bolt 21, and a plurality of washers 25 interposed between the bolt 21 and the nut 23. The friction part 20 is formed by the combination of the bolt 21 and the nut 23 and produces a resisting force that opposes the rotation between the first and the second links 11 and 15. In this embodiment, the resisting force caused by the friction part 20 is stronger than the elastic force of the torsion spring 27.

Figure 4:
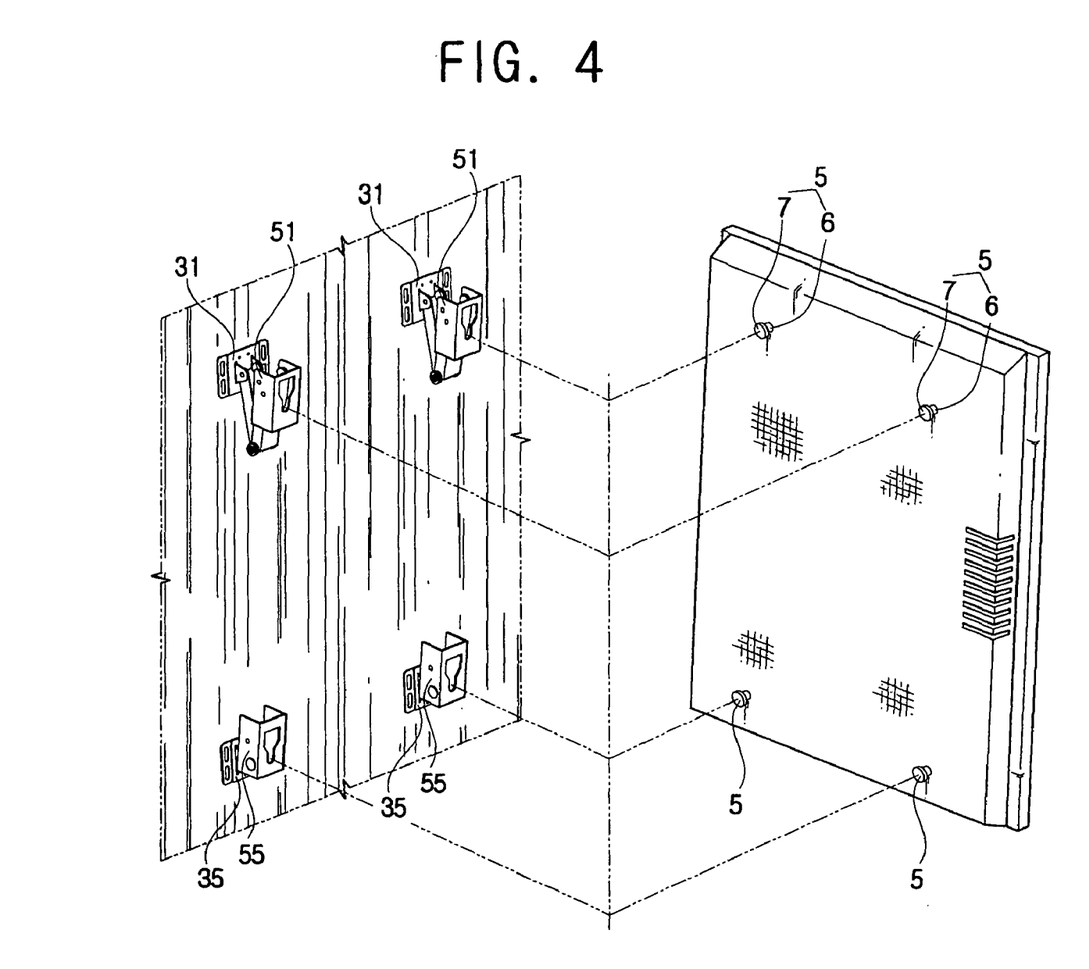

Thus, when the display main body 3 is separated from the upper and lower main brackets 51 and 55, the tilt of the upper main bracket 51 relative to the upper supporting bracket 31 remains unchanged because the resisting force of the friction part 20 is stronger than the elastic force of the torsion spring 27. Further, the plurality of washers 25 interposed between the bolt 21 and the nut 23 prevents the combination of the bolt 21 and the nut 23 from loosening. On the other hand, the installation equipment 1 according to the first embodiment of the present invention allows the display main body 3 to be mounted on the wall 70 lengthwise as shown in FIG. 4. In addition, the installation equipment 1 according to the first embodiment of the present invention may allow the display main body 3 to be mounted on the wall 70 obliquely as desired.

Figure 6:
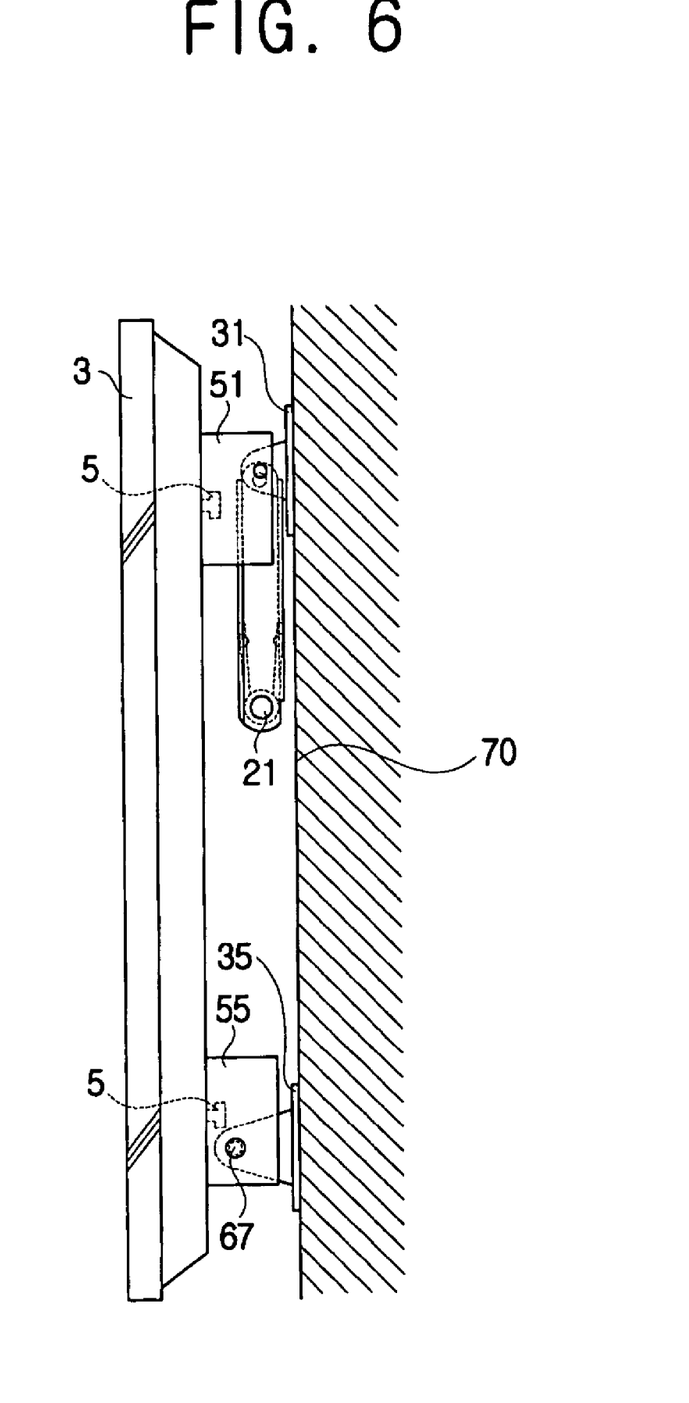
FIG. 6 is a side view illustrating a folded state of the installation equipment of FIG. 2.

With this configuration, the installation equipment 1 according to the first embodiment of the present invention is operated as follows. As shown in FIG. 6, the installation equipment 1 can be completely folded when a user tilts the display main body 3 about the third hinge pin 67 by pushing toward the wall 70. At this time, a user can easily tilt the display main body 3 relative to the wall 70 because the torsion spring 27 elastically biases the display main body 3 toward the wall 70. Further, as the second link 15 rotates about the friction part 20, the first link 11 is accommodated in the second link 15, and simultaneously the second link 15 is accommodated in the upper main bracket 51, so that the upper main bracket 51 is close to the upper supporting bracket 31. Herein, the installation equipment 1 remains folded due to the resisting force of the friction part 20.

Figure 7:
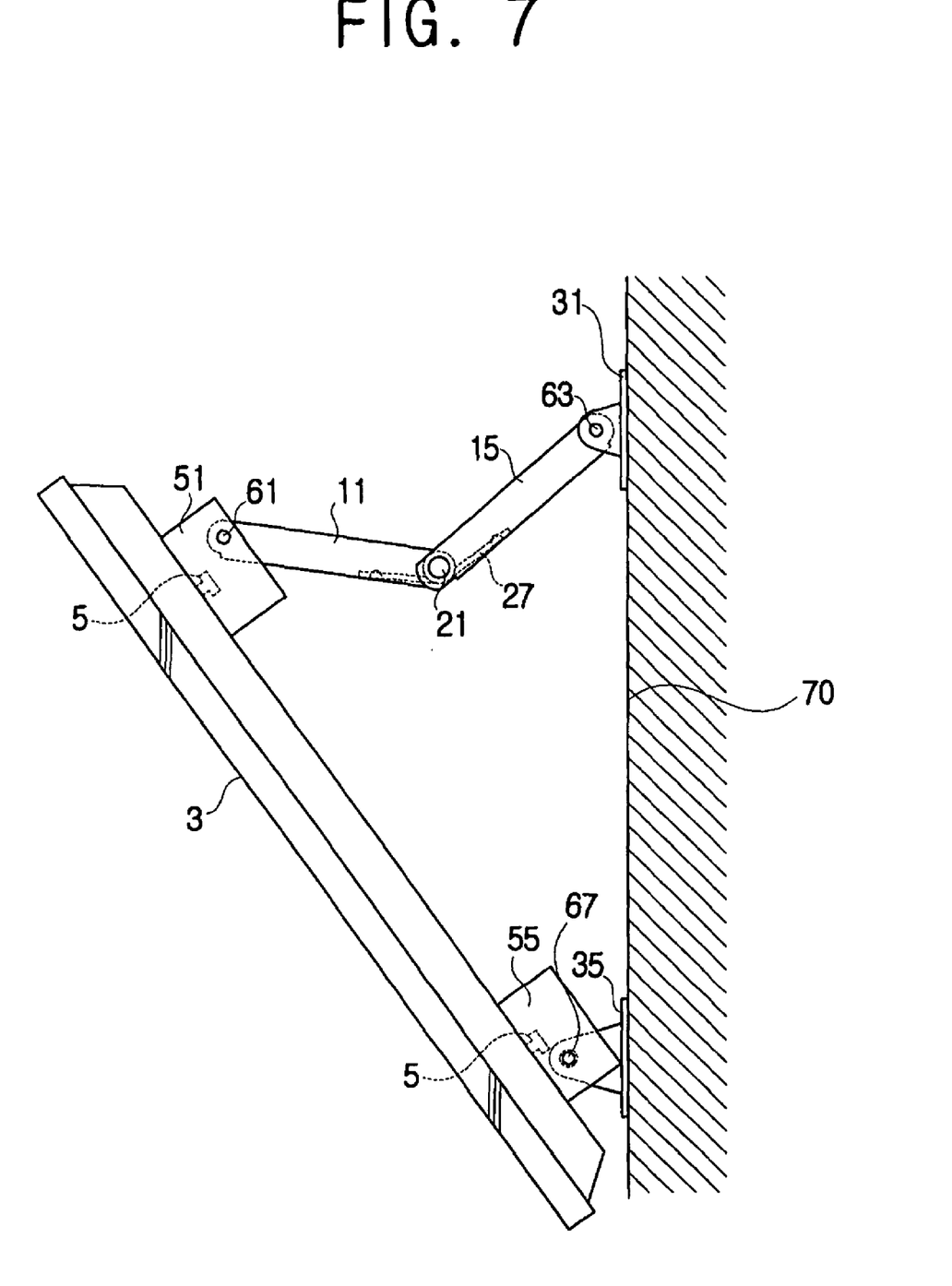
FIG. 7 is a side view illustrating an unfolded state of the installation equipment of FIG. 2.

As shown in FIG. 7, the installation equipment 1 can be unfolded when a user tilts the display main body 3 about at least one third hinge pin 67 by pulling the display main body 3. At this time, the display main body 3 is prevented from tilting forward suddenly because of at least one torsion spring 27 elastically biasing the display main body 3 toward the wall 70. Further, the installation equipment 1 remains folded by the resisting force of the friction part 20. Additionally, in one embodiment, a stopper (not shown) is provided in at least one of the first and second links 11 and 15 to restrict the tiltable angle of display main body 3, wherein the stopper is placed between the upper main bracket 51 and the upper supporting bracket 31, and the lower main bracket 55 and the lower supporting bracket 35. In the foregoing embodiment, the link assembly 10 is rotatably attached to the wall 70 via the upper supporting bracket 31. However, where desired, the link assembly 10 may be rotatably attached to the wall 70 directly. Similarly, in the foregoing embodiment, the link assembly 10 is attached to the display main body 3 via the upper main bracket 51, but, where desired, the link assembly 10 may be attached to the display main body 3 directly.

In the foregoing embodiment, the friction part 20 is provided between the first and second links 11 and 15. However, a friction part may be provided between the upper supporting bracket 31 and the first link 11 or between the upper main bracket 51 and the second link 15. In the foregoing embodiment, the torsion spring 27 is interposed between the first and second links 11 and 15. However, a spring member such as a flat spring, a coil spring, etc. may be provided in at least one joint area related to the first and second links 11 and 15, between the upper supporting bracket 31 and the first link 11, and between the upper main bracket 51 and the second link 15.

In an embodiment described above, the installation equipment 1 is symmetrically latched to the display main body 3 using a pair of brackets. However, the installation equipment 1 may be latched to a display main body using any desired number of brackets. In one of the embodiments described above, the safety bolt 57 and the safety bolt hole 58 are used for preventing the display main body 3 from breaking away from the upper and lower main brackets 51 and 55. In another embodiment, however, a safety pin having no thread and a safety pin hole may be employed as the safety bolt 57 and the safety bolt hole 58, respectively. As described above, according to the first embodiment of the present invention, the installation equipment for the display main body includes the first and second links, the spring member, and the friction part provided between the display main body and the wall. Therefore, the installation equipment has a simple structure and allows a user to tilt the display main body easily. Further, the installation equipment is designed to require the same force, whether the display main body is tilted forward or backward, so that it is convenient for a user to tilt the display main body to provide fine adjustment of the tilt of the display main body.

Further, according to the first embodiment of the present invention, the installation equipment includes the upper supporting bracket, the lower supporting bracket, the upper main bracket, and lower main bracket, which are independent of one another. Therefore, the installation equipment is not only compatible with the display main body of various sizes, but also allows the display main body to be mounted onto the wall at various rotated angles.

Figure 8:
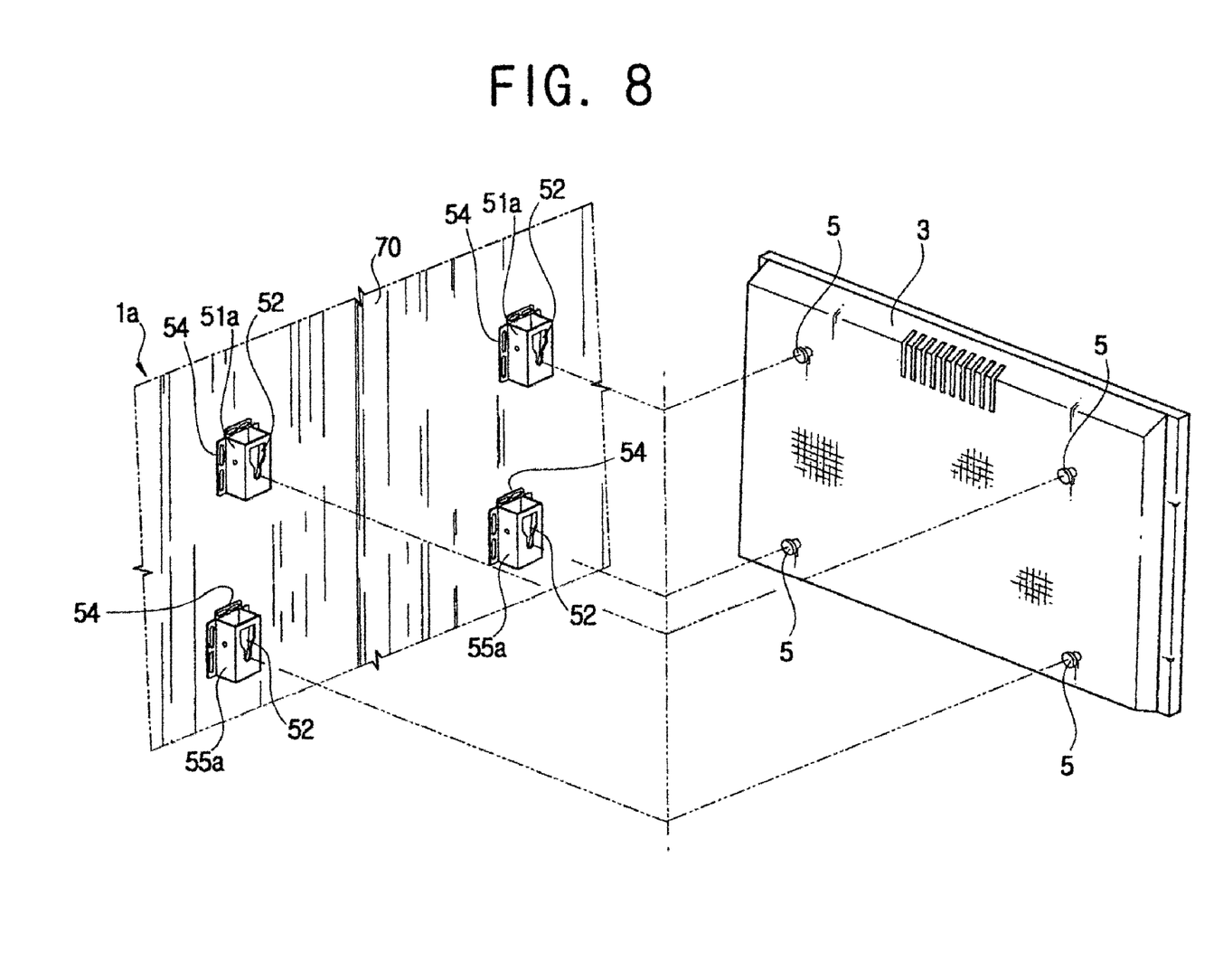
FIG. 8 is a perspective view of installation equipment for a display main body according to a second embodiment of the present invention.

FIG. 8 is a perspective view of an installation equipment 1a for a display main body in accordance with a second embodiment of the present invention. As shown in FIG. 8, the installation equipment 1a according to the second embodiment includes upper and lower main brackets 51a and 55a which, unlike in the first embodiment, are directly attached to the wall 70. The display main body 3 includes the plurality of projections 5 having the shank part 6 and the head part 7. Each of the upper and lower main brackets 51a and 55a includes a flange part 54 parallel with the wall 70 and a projection holding part 52 to which the projection 5 of the display main body 3 is latched. Therefore, the installation equipment according to the second embodiment of the present invention not only is compatible with the display main body of various sizes, but also allows the display main body to be mounted onto the wall at various rotated angles. Further, the installation equipment according to the second embodiment is simpler than the installation equipment according to the first embodiment, providing more convenience in mounting the display main body onto the installation surface such as the wall.

Figure 9:
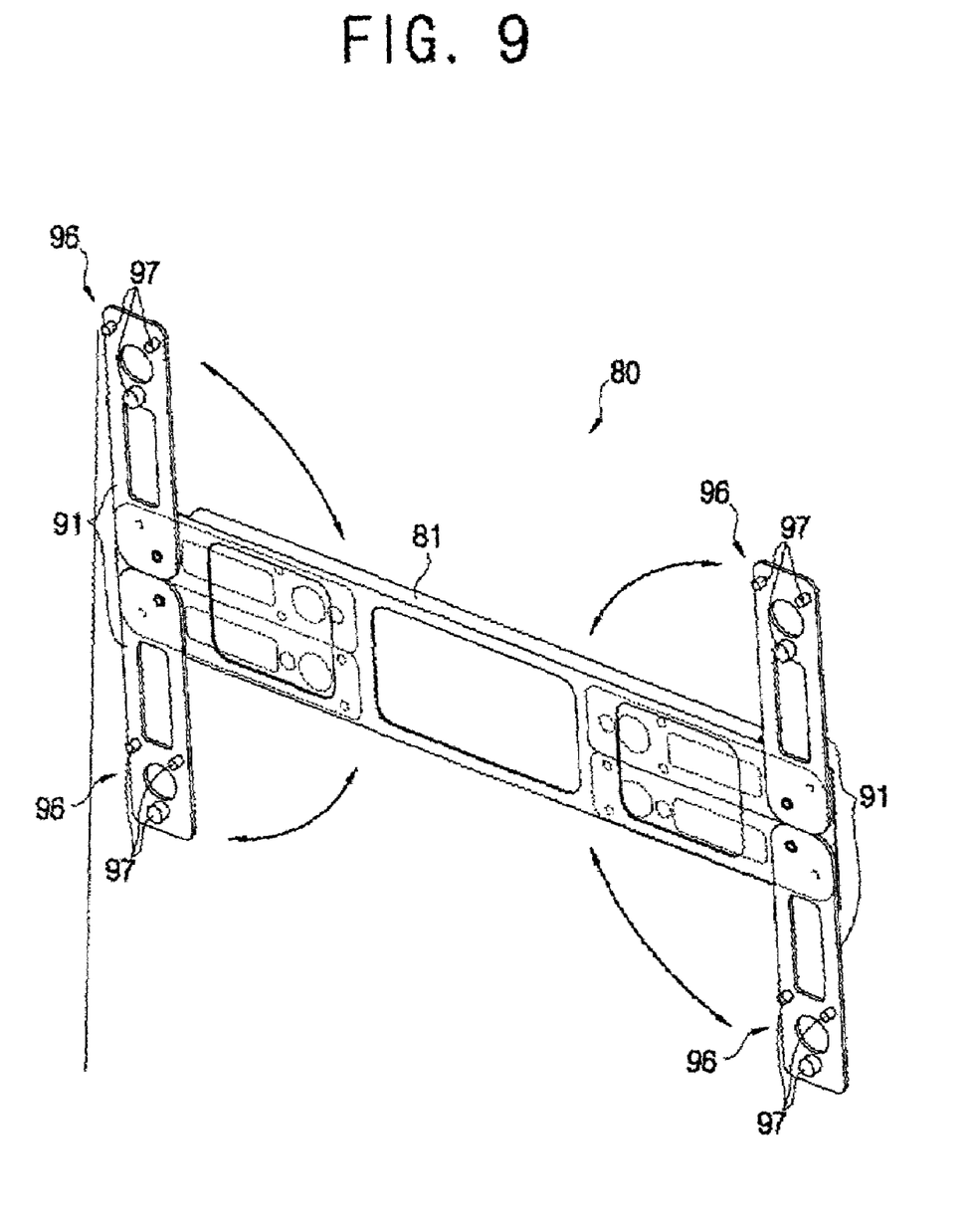
FIG. 9 is a perspective view of a jig for the installation equipment according to an embodiment of the present invention.
Figure 10:
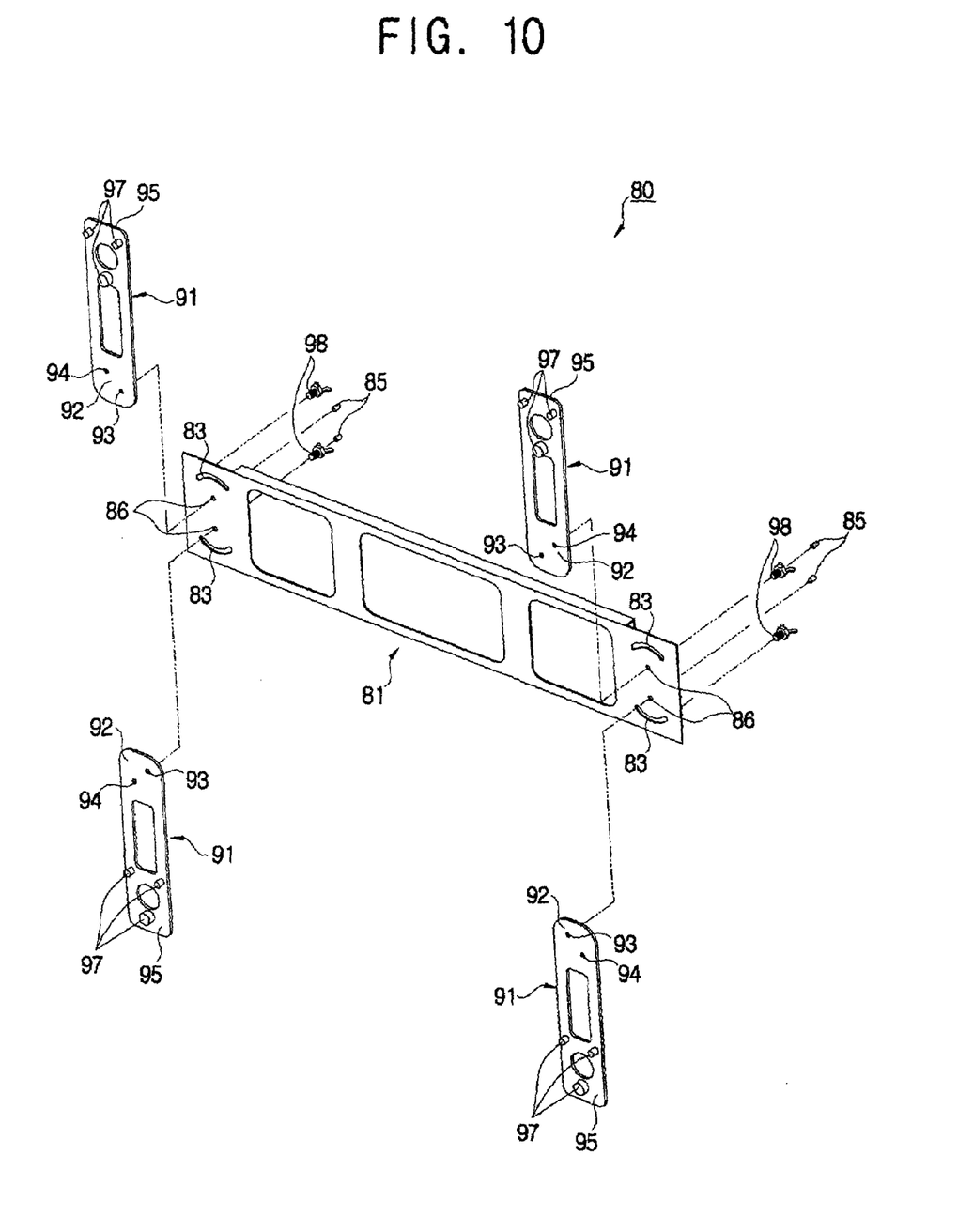
FIG. 10 is an exploded perspective view of the jig of FIG. 9.
Figure 11:
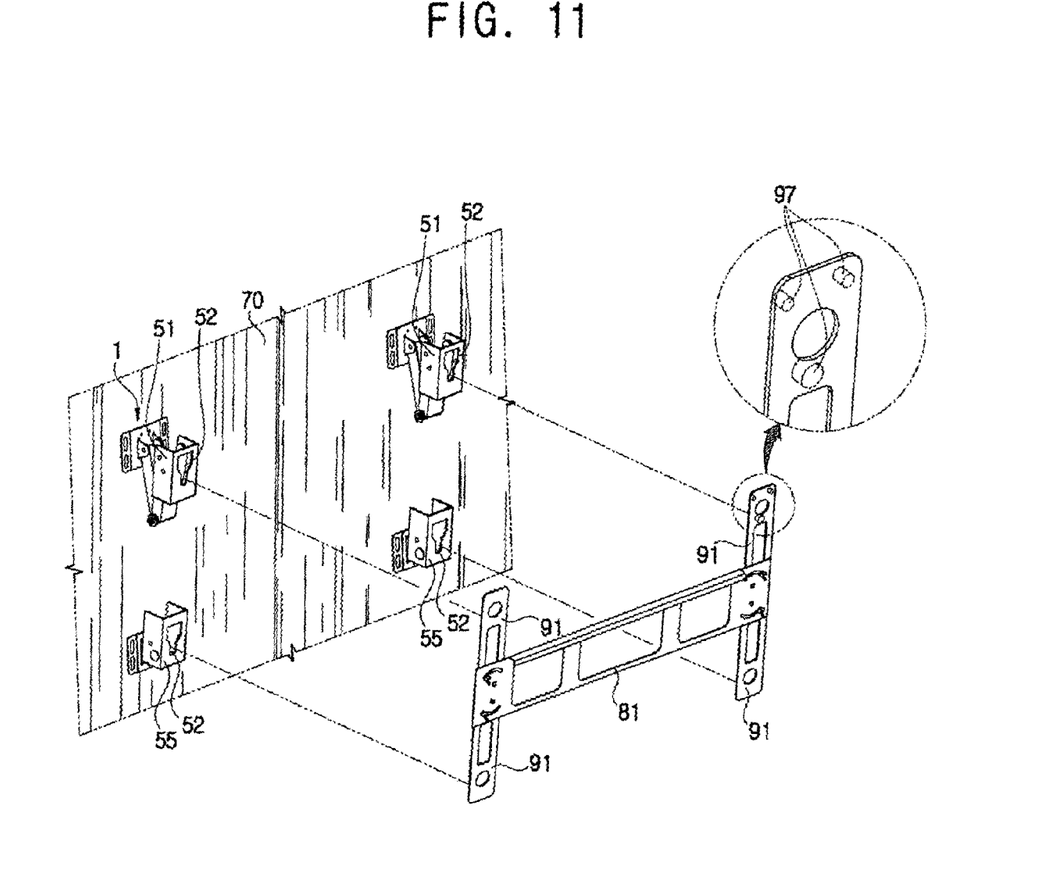
FIG. 11 is a perspective view illustrating the jig of FIG. 9 and the installation equipment in accordance with the present invention just before the combination.

FIGS. 9 through 11 illustrate a jig for the installation equipment according to one embodiment of the present invention. As shown therein, a jig 80 comprises a jig frame 81 shaped like a plate, and a supporting arm 91 provided as a pair of opposite end parts of the jig frame 81. The jig frame 81 includes first hinge holes 86 positioned at the opposite end parts thereof and to which hinge pins 85 are inserted for rotatably supporting the supporting arms 91 and has slots 83 to guide moving paths of wing bolts 98. The first hinge hole 86 corresponds to a second hinge hole 93 formed on the supporting arm 91, and the hinge pin 85 is inserted in the first and second hinge holes 86 and 93 and hammered at the opposite ends thereof, thereby rotatably combining the supporting arm 91 to the jig frame 81. Therefore, the supporting arm 91 is rotatable relative to the jig frame 81 about the hinge pin 85.

The slot 83 is formed by partially cutting out the jig frame 81 at a predetermined distance from the first hinge hole 86. The slot 83 is shaped like an arc that has a central angle of 90°, thereby guiding and limiting the moving path of the wing bolt 98. Therefore, as shown in FIG. 9, the supporting arm 91 is rotatable within an angle of 90° relative to the jig frame 81, so that the supporting arm 91 can be folded up into the jig frame 81 and unfolded perpendicularly to a longitudinal direction of the jig frame 81. The supporting arm 91 includes a first part 92 attached to the jig frame 81 and a second part 95 detachably attached to the installation equipment 1 according to the first embodiment. The first part 92 of the supporting arm 91 is formed with the second hinge hole 93 corresponding to the first hinge hole 86 of the jig frame 81, and a guide projection is inserted in the slot 83 of the jig frame 81.

In the present embodiment, the wing screw 98 is employed as the guide projection, so that the first part 92 is formed with a screw hole 94 in which the wing screw 98 is inserted through the slot 83. Therefore, a user can easily lock the supporting arm 91 by tightening the wing screw 98 when the supporting arm 91 is rotated at a predetermined angle relative to the jig frame 81. Herein, the wing screw 98 is preferably employed as the guide projection, but a projection protruding from the surface of the supporting arm, and/or other kinds of screws, etc. may also be employed as the guide projection. The second part 95 of the supporting arm 91 is provided with a combining projection part 96 protruding in correspondence to the projection holding part 52 formed in the upper and lower main brackets 51 and 55 of the installation equipment 1 according to the first embodiment.

The combining projection part 96 includes three magnetic projections 97, two being inserted in the upper part of the projection holding part 52, and one being inserted in the lower part of the projection holding part 52. Herein, the combining projection part 96 attracts the upper and lower main brackets 51 and 55 when the upper and lower main brackets 51 and 55 are made of magnetic metal. Further, when the four supporting arms 91 are unfolded perpendicularly to the longitudinal direction of the jig frame 81, the combining projection parts 96 may be positioned in correspondence to the projections 5 of the display main body 3, respectively, wherein the jig for the installation equipment is operated as follows. As shown in FIG. 9, the supporting arm 91 is foldably provided as a pair in the opposite end parts of the jig frame 81, so that the supporting arms 91 can be folded up into the jig frame 81 and unfolded perpendicularly to the longitudinal direction of the jig frame 81. Thus, the jig 80 is convenient to carry because it is foldable.

As shown in FIG. 11, when the supporting arms 91 are unfolded perpendicularly to the longitudinal direction of the jig frame 81, the upper and lower main brackets 51 and 55 of the installation equipment 1 are inserted onto the combining projection parts 96 of the supporting arms 91 and then magnetically attached to the combining projection part 96 by the magnetic projections 97. At this time, the projection holding parts 52 can easily be detached from the combining projection part 96 with a force enough to overcome the magnetic force. Thereafter, the installation equipment 1 magnetically attached to the combining projection parts 96 of the jig 80 is fastened to the wall 70 with a screw, etc. Consequently, a user can easily install the installation equipment 1 onto the wall 70 without setting up the position of each portion of the installation equipment 1. Thus, the display main body 3 is mounted to the installation equipment 1 after detaching the jig 80 from the installation equipment 1. In the above description, the jig 80 is applied to the installation equipment 1 according to the first embodiment, but can also be applied to the installation equipment 1a according to the second embodiment.

In the foregoing embodiment, the supporting arms 91 form two pairs. However, the number of the supporting arms varies in correspondence with the number of the upper and lower main brackets of the installation equipment. In the foregoing embodiment, the slot 83 is formed on the jig frame 81, and the guide projection is guided by the slot 83 that is provided in the supporting arm 91. Alternatively, the slot may be provided in the supporting arm and the guide projection may be provided in the jig frame 81. In the foregoing embodiment, the second part 95 of the supporting arm 91 is provided with the combining projection part 96 that has three magnetic projections 97 in order to detachably combine the second parts 95 of the supporting arms 91 with the projection holding parts 52 of the upper and lower main brackets 51 and 55. In alternate embodiments, the second parts of the supporting arms may be detachably attached to the projection holding parts 52 of the upper and lower main brackets 51 and 55 by means of a bolt, a locking unit, etc.

As described above, according to the present invention, a jig for an installation equipment has a jig frame, a supporting arm rotatably attached to the jig frame, and a combining projection part provided in the supporting arm and detachably attached to upper and lower main brackets of the installation equipment, thereby allowing a user to install the installation equipment to a wall easily. As described above, the present invention provides installation equipment for a display main body and a jig for the installation equipment, wherein the installation equipment and the jig have a simple structure and are convenient for mounting the display main body onto a wall. Further, the present invention provides installation equipment for a display main body and a jig for the installation equipment, which allow a display main body to be tilted easily and adjusted finely, to be mounted onto a wall at various rotated angles, and to be compatible with various sizes of the display main body.

Although a few embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. Apparatus for mounting a display main body onto an installation surface, comprising:
    installation equipment comprising:
        a link assembly including a first link having a first end rotatably attached to the installation surface, a second link having a first end rotatably attached to the display main body and a second end rotatably attached to a second end of the first link, and a spring member provided in at least one joint area of the first and second links and elastically biasing the display main body toward a wall;
        a lower supporting bracket attached to the installation surface and rotatably supporting a lower back of the display main body; and
        an upper supporting bracket attached to the installation surface and supporting the link assembly; and
    a jig to install the installation equipment onto an installation surface, the jig comprising a jig frame shaped like a plate and having a first part of a supporting arm rotatably attached to the jig frame.

2. The apparatus according to claim 1, wherein the upper supporting bracket is rotatably attached to the first end of the first link.

3. The apparatus according to claim 1, further comprising:
    an upper main bracket detachably attached to an upper back of the display main body and rotatably attached to the first end of the second link; and a lower main bracket detachably attached to the lower back of the display main body and rotatably attached to the lower supporting bracket.

4. The apparatus according to claim 1, wherein the link assembly further includes a friction part provided in a joint area between the first and second links and resisting rotation between the first and second links.

5. The apparatus according to claim 4, wherein a resisting force of the friction part is stronger than an elastic force of the spring member.

6. The apparatus according to claim 5, wherein the spring member includes a torsion spring having a first end coupled to the first link and a second end coupled to the second link.

7. The apparatus according to claim 6, wherein the friction part includes a bolt passing through the torsion spring and the joint area between the first and second links, a nut matching with the bolt, and at least one washer interposed between the bolt and the nut.

8. The apparatus according to claim 3, wherein the upper and lower main brackets are formed with projection holding parts in correspondence to a plurality of projections provided in a back of the display main body.

9. The apparatus according to claim 8, wherein the projections each include a shank part protruding from the back of the display main body and a head part formed on an end of the shank part and having a larger diameter than the shank part, and the projection holding parts include an upper part larger than the head part of the projections, and a lower part smaller than the head part and larger than the shank part of the projections.

10. The apparatus according to claim 9, wherein the upper and lower main brackets each further include a safety bolt to prevent the display main body from breaking away from the upper and lower main brackets due to an external force and a safety bolt hole to which the safety bolt is attached to the projection holding part.

11. An apparatus for mounting a display main body onto an installation surface, comprising:
installation equipment comprising:
an upper main bracket attached to the installation surface and detachably attached to an upper back of the display main body; and
a lower main bracket attached to the installation surface, detachably attached to a lower back of the display main body and spaced from the upper main bracket; and
a jig to install the installation equipment onto an installation surface, the jig comprising a jig frame shaped like a plate and having a first part of a supporting arm rotatably attached to the jig frames,
wherein one of the supporting arm and the jig frame is formed with a slot shaped like an arc and guiding rotation of the supporting arm relative to the jig frame within a predetermined angle, and the other one is provided with a guide projection inserted in and guided by the slot.

12. The apparatus according to claim 11, wherein the upper and lower main brackets are formed with projection holding parts in correspondence to a plurality of projections provided in a back of the display main body.

13. The apparatus according to claim 12, wherein the projections each include a shank part protruding from the back of the display main body, and a head part formed on an end of the shank part and having a larger diameter than the shank part, and the projection holding parts each include an upper part larger than the head part of the projection and a lower part smaller than the head part and larger than the shank part of the projection.

14. The apparatus according to claim 13, wherein the upper and lower main brackets each further include a safety bolt to prevent the display main body from breaking away from the upper and lower main brackets due to an external force and a safety bolt hole through which the safety bolt is attached to the projection holding part.

15. The apparatus according to claim 1, wherein at least one pair of supporting arms includes the first part attached to opposite end parts of the jig frame, and a second part detachably attached to the installation equipment, respectively.

16. The apparatus according to claim 1, wherein one of the supporting arm and the jig frame is formed with a first arc-shaped slot and guiding rotation of the supporting arm relative to the jig frame within a predetermined angle; and
the other one of the supporting arm and the jig frame is formed with a second slot that is provided with a guide projection inserted into the second slot and guided by a shape of the second slot.

17. The apparatus according to claim 15, wherein the second part of the supporting arm is provided with a combining projection part protruding in correspondence with a projection holding part of the installation equipment.

18. The apparatus according to claim 17, wherein the combining projection part includes three magnetic projections.

19. The apparatus according to claim 15, wherein the supporting arms are provided as a pair in opposite end parts of the jig frame.

20. The apparatus according to claim 11, wherein at least one pair of supporting arms includes the first part attached to opposite end parts of the jig frame, and a second part detachably attached to the installation equipment, respectively.

21. The apparatus according to claim 11, wherein one of the supporting arm and the jig frame is formed with a first slot shaped like an arc and guiding rotation of the supporting arm relative to the jig frame within a predetermined angle; and
the other one of the supporting arm and the jig frame is formed with a second slot that is provided with a guide projection inserted into the second slot and guided by a shape of the second slot.

22. The apparatus according to claim 20, wherein the second part of the supporting arm is provided with a combining projection part protruding in correspondence with a projection holding part of the installation equipment.

23. The apparatus according to claim 22, wherein the combining projection part includes three magnetic projections.

24. The apparatus according to claim 20, wherein the supporting arms are provided as a pair in opposite end parts of the jig frame.

25. An apparatus for mounting a display main body onto an installation surface, comprising:
installation equipment comprising:
an upper bracket attached to the installation surface and rotatably attached to a torsion spring link assembly that is rotatably detachably attached to an upper back of the display main body; and
a lower bracket attached to the installation surface and rotatably detachably attached to a lower back of the display main body; and a jig for installing the installation equipment onto an installation surface, comprising:
a jig frame shaped like a plate; and
at least one pair of supporting arms including a first part attached to opposite end parts of the jig frame, and a second part detachably attached to the installation equipment, respectively.

26. The apparatus according to claim 25, further comprising another upper bracket attached to the installation surface so that the upper bracket and another upper bracket are arranged horizontally with respect to each other.

27. The apparatus according to claim 25, further comprising another lower bracket attached to the installation surface so that the lower bracket and another lower bracket are arranged horizontally with respect to each other.

28. A method of mounting a display main body onto an installation surface, comprising:
attaching an upper bracket to the installation surface;
attaching, detachably and rotatably, the upper bracket to a torsion spring link assembly that is rotatably detachably attached to an upper back of the display main body;
attaching a lower bracket to the installation surface;
attaching, detachably and rotatably, the lower bracket to a lower back of the display main body, wherein the upper bracket, the torsion spring link assembly, and the lower bracket comprise installation equipment; and
using a jig to install the installation equipment onto an installation surface, wherein the jig comprises:
a jig frame shaped like a plate; and
at least one pair of supporting arms including a first part attached to opposite end parts of the jig frame, and a second part detachably attached to the installation equipment, respectively.

* * * * *

UNITED STATES PATENT AND TRADEMARK OFFICE
CERTIFICATE OF CORRECTION

PATENT NO.       : 7,097,143 B2                                Page 1 of 1
APPLICATION NO.  : 10/613012
DATED            : August 29, 2006
INVENTOR(S)      : Seong-soo Kim et al.

It is certified that error appears in the above-identified patent and that said Letters Patent is hereby corrected as shown below:

On Title Page, Item (56) (Other Publications), Line 2, after "03137803.X" insert --,--.

Column 11, Line 52, change "frames," to --frame,--.

Signed and Sealed this

Sixth Day of February, 2007

JON W. DUDAS
*Director of the United States Patent and Trademark Office*